Nov. 19, 1968   T. W. HOTCHKISS ET AL   3,411,383
HORIZONTAL SPINDLE DRILLING MACHINE WITH
CONSTANT SPEED HYDRAULIC DRIVE
Filed Dec. 31, 1964                                          6 Sheets-Sheet 1

Thomas W. Hotchkiss
Eric F. Bloch
INVENTORS.

BY *Clarence A O'Brien*
*and Harvey B. Jacobson*
Attorneys ited States Patent Office 3,411,383
Patented Nov. 19, 1968

3,411,383
HORIZONTAL SPINDLE DRILLING MACHINE WITH CONSTANT SPEED HYDRAULIC DRIVE
Thomas W. Hotchkiss and Eric F. Bloch, Milford, Conn., assignors, by mesne assignments, to Eldorado Tool and Manufacturing Corporation, a corporation of Connecticut
Filed Dec. 31, 1964, Ser. No. 422,798
12 Claims. (Cl. 77—5)

ABSTRACT OF THE DISCLOSURE

A drilling machine of the horizontal spindle type having a constant speed hydraulic drive motor associated therewith capable of precise adjustment. The spindle is carried by a movable carriage having a pair of extensible and contractible motors operatively associated therewith for reciprocating the carriage. The spindle drivingly engages an elongated gun drill which extends through a guide at the outer end thereof and into a chip box with a work holder disposed on the outer surface of the chip box. A protective bellows extends between the drill carriage and the chip box to form a cover for the elongated drill. The hydraulic drive motor is provided with a precise control including a compensator for maintaining the output speed of the hydraulic motor substantially constant regardless of load variation on the output of the motor.

---

The present invention generally relates to a drilling machine for precision gun drilling having a horizontal spindle incorporating a hydraulic drive system for maintaining the rotational speed of the spindle and gun drill and other novel features to enable deep hole drilling to be accomplished in a precise and accurate manner.

A most important object of the present invention is to provide a drilling machine of the horizontal spindle type that includes a hydraulic drive motor for rotating the spindle at a constant but adjustable speed by incorporating a compensator assembly in the hydraulic system to maintain constant output speed of the hydraulic drive motor regardless of load variatons exerted on the spindle thereby providing a constant rotational speed for the spindle.

Another object of the present invention is to provide a drilling machine in accordance with the preceding object in which dual feed cylinders are employed that will pull evenly on both sides of the spindle axis or drill center line thereby precluding any tendency for the spindle to lift, tip or cant.

Still another important object of the present invention is to provide a drilling machine having a master V way and a trailing flat way for rigidity and accuracy of movement of the drilling head.

Still another important feature of the present invention is to provide a micrometer adjustment for the rotational speed of the spindle and a similar adjustment of the feed rate thereof.

Another significant feature of the invention resides in the provision of interchangeability of parts from left to right and the use of removable skirts and housing for protecting the feed mechanism and ways from damage.

A still further significant feature of the drilling machine is the provision of a chip box having a transparent cover and provided with a split rear bushing and a chute which may be orientated to the left or right with the bearing and chip box being accurately prealigned to provide concentric surfaces for attachment and being rigidly affixed to the base structure to maintain prealignment.

Still another significant feature of the present invention is to provide a drilling machine having a hydraulic drive motor and a control assembly associated therewith in the form of a compact assembly for operation of the machine either from the left or right side and which may include means therein to retain the temperature of the hydraulic fluid at a desired temperature with all components being readily accessible for servicing and maintenance and including safety interlocks for rendering the device substantially fool-proof and safe in operation and yet provide a drilling machine which is relatively inexpensive to operate and maintain while maintaining precision drilling standards.

Another feature of this invention is to provide a bellows type cover for the spindle and gun drill.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

In certain of the drawings, component parts have been omitted in certain instances for clarity of illustration and description.

Referring now specifically to the drawings, the numeral 10 generally designates the drilling machine of the present invention which includes a base structure 12 having apertures 14 therethrough for receiving holddown bolts or other securing devices as may be deemed desirable to retain the drill in place on a supporting surface.

The base 12 includes a center web 16 reinforced by depending ribs 17 and upstanding longitudinal support elements 18. One of the support elements is provided with a longitudinal inverted V-shaped way 20 keyed thereon by keys 21 while the other support element 18 is provided with a flat way 22 thereon for movably supporting a drilling head 24. The master V way 20 and the flat trailing way 22 serve to rigidify and accurately position the drilling head 24 during reciprocation thereon and are held in place by suitable bolts 23.

Attached to one end of the base 12 is a chip box assembly 26 and attached to the other end of the base 12 is a skirt supporting assembly 28. Supported above the ways 20 and 22 is a pair of feed rods 30. The end of the feed rods 30 adjacent the chip box assembly 26 are attached to the rod supports 31 which are in turn supported by upstanding walls 18 of the base 12 and the upstanding wall 164 of the chip box assembly 26 for rigidly but detachably supporting the forward ends of the feed rods 30. The ends of the feed rods 30 remote from the chip box 26 are received within feed cylinders 32 and have a piston 33 rigid therewith slidable in the cylinder 32 so that fluid pressure introduced into opposite ends of the cylinder 32 through hydraulic conduits 34 and 36 will cause reciprocation of the cylinders 32 in relation to the feed rods 30 which are stationary. The cylinders 32 are rigidly affixed to the head 24 by use of clamping lugs 38 and bolts 40. Thus, the cylinders 32 will reciprocate in relation to the rod 30 and will move the drill head 24 along the supporting ways 20 and 22. The particular seals for the cylinders 32 and the particular construction of the piston and the seal between the piston and the cylinder may be varied and of conventional construction.

Figure 2:
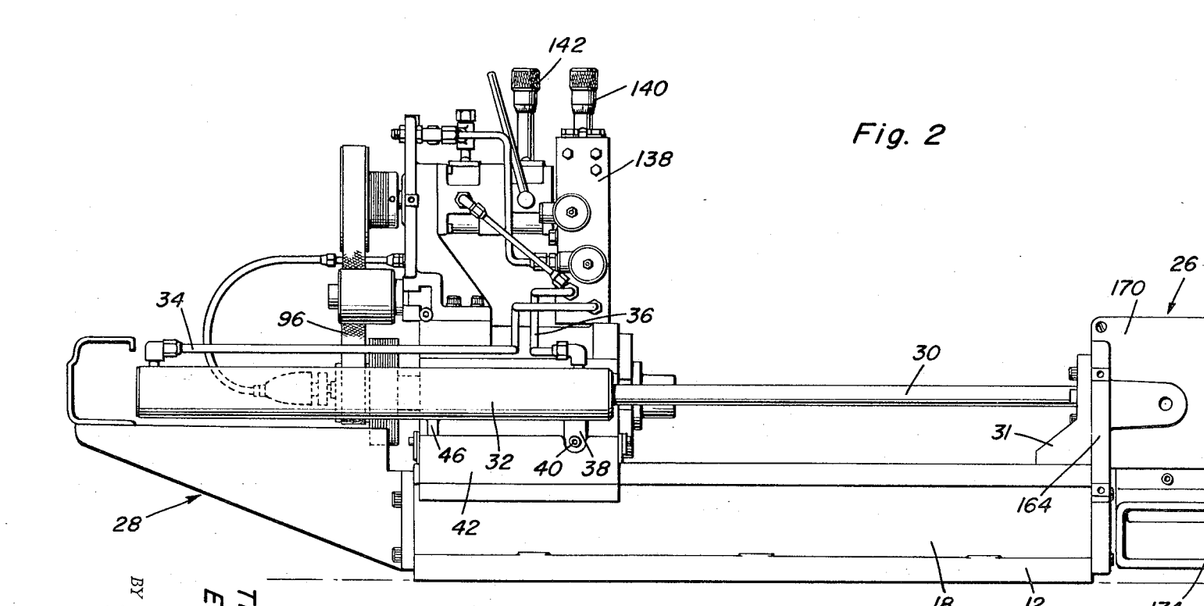
FIGURE 2 is a side elevational view of the drilling machine with the protector skirts and housing removed.
Figure 3:
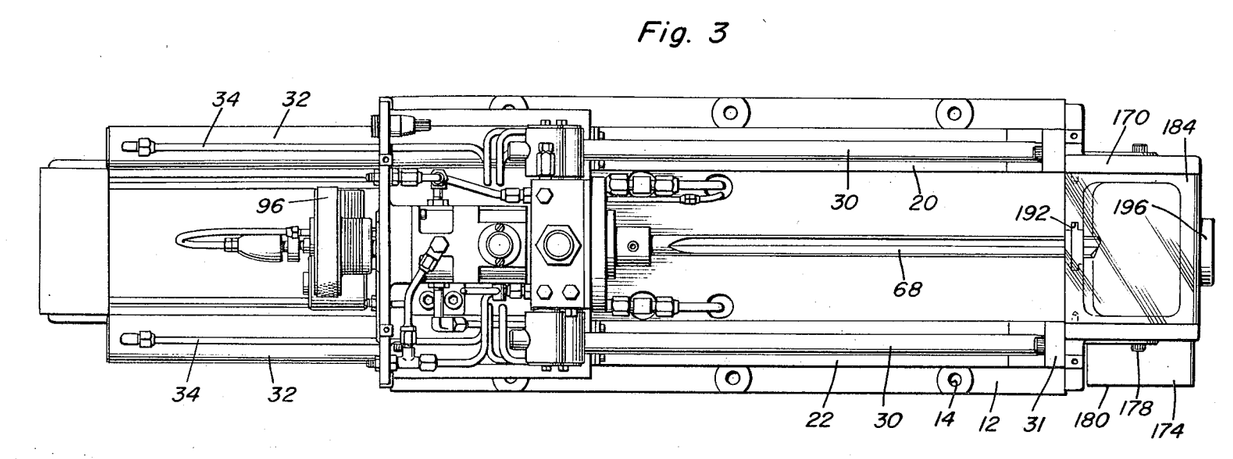
FIGURE 3 is a top plan view, on an enlarged scale, of the machine.

The drill head 24 includes a supporting body 42 having a recess 44 in the upper surface thereof for receiving a portion of the periphery of each cylinder 32. The bolts 40 extend through the attaching lugs 38 and are screwthreaded into the body 42 as illustrated in FIGURE 2. A rear lug 46 also is connected to each cylinder 32 and attached to body 42 in a manner similar to lugs 38. Also, the bottom surface of the body 42 is provided with an inverted V-shaped groove 48 and a flat surface 50 engaging the ways 20 and 22 and there is also a vertical depending gib 52 having an inner surface 54 alongside the outer surface of the way 22 and an inwardly extending member 56 which extends under the outer edge of the way 22. Likewise, a similar gib assembly is provided on the opposite side of the body 42 including a gib 58 which extends under the outer edge of the way 20 for retaining the drill head on the ways. The gibs 56 and 58 may be adjusted to attain optimum rigidity and precision of motion and also removed for enabling detachment of the drill head from the ways when desired.

The central portion of the body 42 includes a cylindrical sleeve-like opening 60 receiving a cylindrical spindle 62 which has a projecting chuck or socket 64 at the end thereof facing the chip box assembly 26 for receiving the supported end 66 of an elongated gundrill 68 of conventional construction which includes a longitudinal passageway 70 therein and a longitudinal channel 72 in the surface thereof communicating with the working end 74 of the gundrill 68. A suitable setscrew 76 or other clamping means is provided for detachably securing the gundrill 68 in place with the longitudinal passage 70 in alignment with a coolant passage 78 in the spindle 62 for supplying pressurized coolant to the working end 74 of the gundrill 68. The spindle 62 is provided with conventional lubricating facilities such as mist lubrication or the like. A retaining ring 82 is attached to the end of the wall defining the opening 60 facing the chip box assembly 26 and the retaining ring 82 is secured in place by screwthreaded fasteners 84 or the like. The other end of the spindle 62 is provided with an axial shaft extension 86 having a stub shaft 88 attached thereto to which is attached a pulley 90 having two sections 92 and 94 formed thereon of different diameters for enabling variation of the rotational speed of the spindle 62 by shifting a drive belt 96 to engage either the pulley section 92 or the pulley section 94. The peripheral surfaces of the pulley sections 92 and 94 are grooved as at 98 to provide a driving fit between the belt 96 which is also grooved and the pulley surface. The pulley 90 is secured to the stub shaft 88 by a pair of key locks 100 and a retaining lock nut 101 to provide a positive lock between the pulley 90 and the stub shaft 88. The belt 96 is capable of transmitting the forces necessary to be transmitted and the belt is engaged with a similar drive pulley 102 having sections 104 and 106 each of which also are grooved for receiving the grooved belt 96. Thus, by shifting the grooved belt from the large section 106 to the small section 104 on the pulley 102 and shifting the belt 96 from the small section 94 to the large section 92 on the driven pulley 90, the speed ratio between the drive pulley 102 and the driven pulley 90 may be varied and set at two different values.

Figures 4, 5, 9:
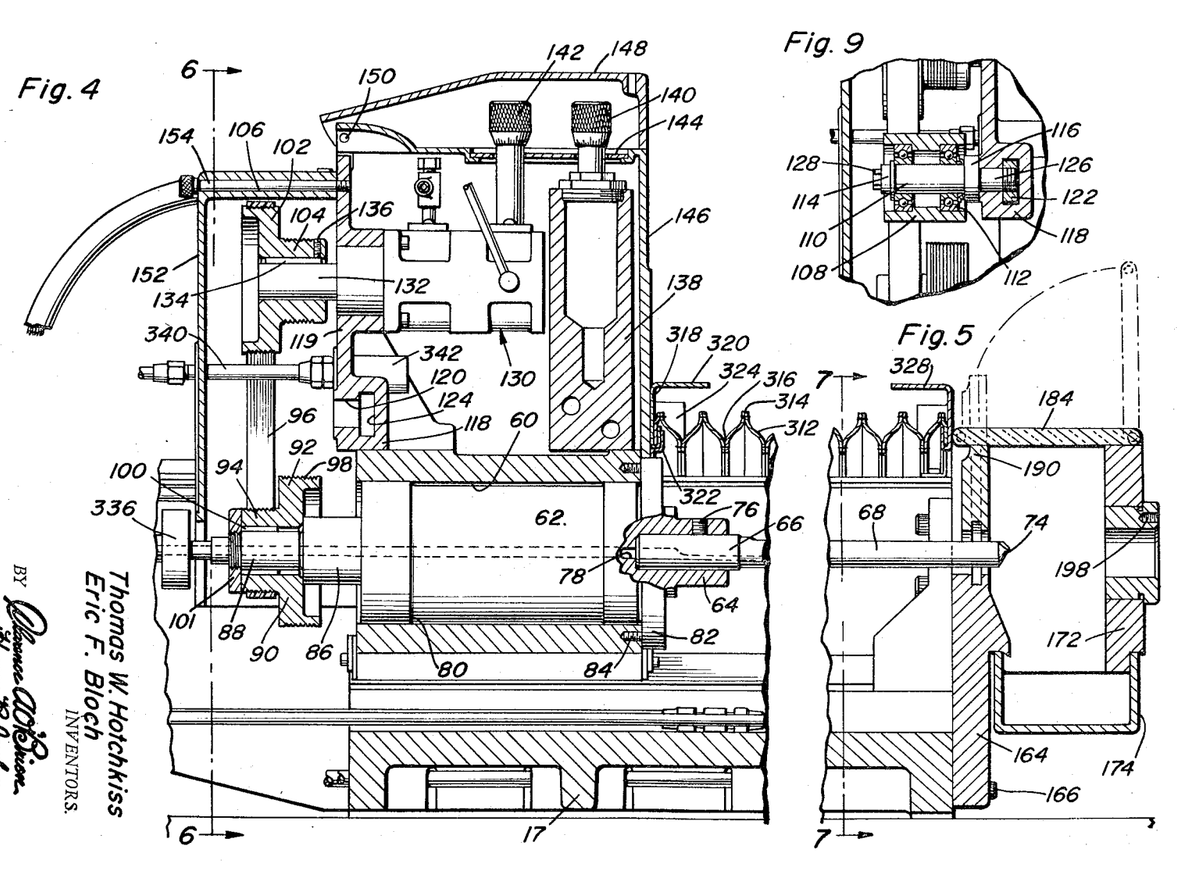
FIGURE 4 is a vertical sectional view taken generally along section line 4—4 of FIGURE 1 illustrating the spindle structure and drive therefor together with micrometer controls for the spindle speed and feed rate.
FIGURE 5 is a detailed sectional view of the chip box illustrating the structural details thereof.
FIGURE 9 is a detailed sectional view illustrating the belt drive structure and take-up mechanism.
Figure 6:
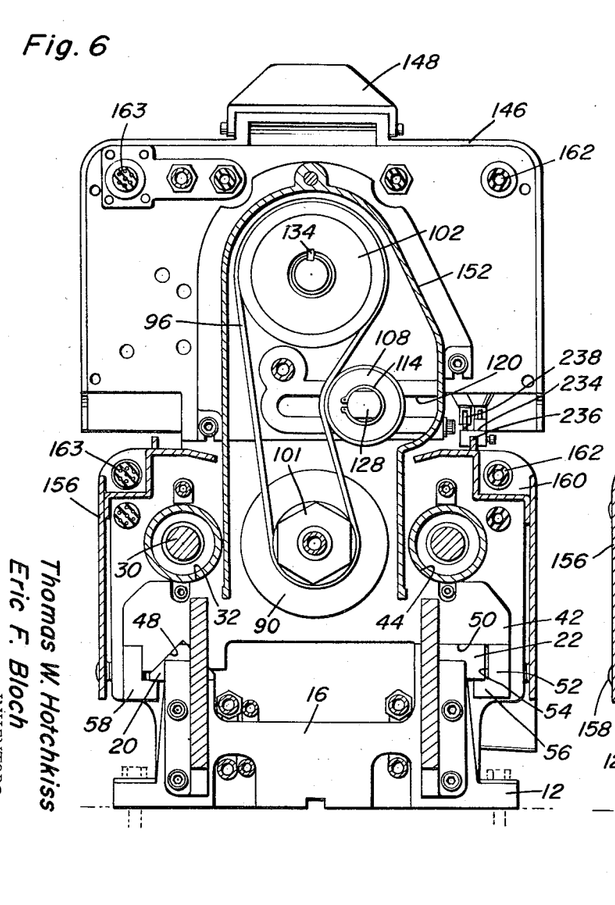
FIGURE 6 is a transverse sectional view taken along section line 6—6 of FIGURE 4 just rearwardly of the spindle drive mechanism illustrating the structural details thereof.
Figure 7:
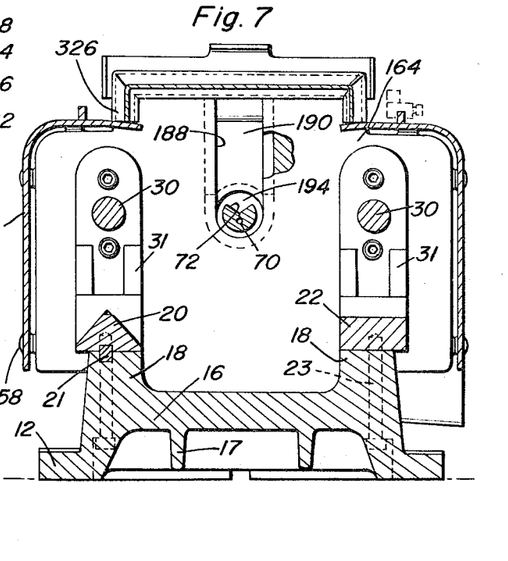
FIGURE 7 is a transverse sectional view taken along section line 7—7 of FIGURE 5 inwardly of the drill nose illustrating the construction of the ways and the feed mechanism.

The belt 96 has a certain degree of slack therein and a slack take-up roller 108 engages the outer surface of the belt between the pulleys 90 and 102. As illustrated in FIGURE 9, the take-up roller 108 is journalled on a stub shaft 110 by a pair of bearing assemblies 112 with the bearing assemblies engaging internal shoulders on the take-up roller 108 and being retained in place by a retainer 114. The other end of the stub shaft 110 is provided with an abutment 116 engaging the surface of a bracket structure 118 having an undercut slot 120 therein receiving a nut 122 slidably but non-rotatably in the undercut portion 124 thereof. The end of the shaft 110 has a threaded axial projection 126 which is slidably received within the slot 120 and screwthreadedly engaged with the nut 122 whereby rotation of the shaft 110 and the axial projection 126 will tighten and loosen the nut 122 thus clampingly adjusting the take-up roller 108 in adjusted position. The split spring retainer 114 is provided on the shaft 110 to serve as a retainer for the bearing assembly 112 while a polygonal head 128 is used to rotate the shaft 110. Thus, by loosening the nut 122 by rotating the shaft 110 by employing a suitable wrench or the like, the take-up roller 108 may be adjusted toward and away from a plane extending between the axis of rotation of the pulleys 90 and 102.

Supported at the upper end of the bracket structure 118 that forms a portion of a motor mounting plate 119 is a hydraulic motor 130 having an output shaft 132 keyed to the pulley 102 by a longitudinal key 134 with the pulley 102 secured in place by a setscrew 136. Thus, as the hydraulic motor 130 is actuated, the pulley 102 will be driven and the belt 96 will correspondingly drive pulley 90 and the spindle 62 together with the gundrill 68 connected thereto.

Positioned near the end of the hydraulic motor 130 is a manifold 138 having a micrometer adjustment 140 projecting above the upper end thereof. Also, the hydraulic motor 130 has a micrometer adjustment device 142 associated therewith with the micrometer adjustment handle extending upwardly through a cover plate 144 recessed into a housing 146 which encompasses and encloses the manifold 138, hydraulic motor 130 and related structural components. A cover 148 is pivotally attached to the housing 146 by a hinge pin 150 or the like to enable access to the micrometer adjustment structures 140 and 142. The micrometer adjustment assembly 142 and 140 provide for adjustment in the speed of rotation of the spindle and adjustment in the feed rate of the feed cylinders. Also attached to the housing 146 which may form a part of or be connected with plate 119, is a rear cover plate 152 which encloses the drive pulley and belt and related mechanism. The rear housing or cover plate 152 is detachably retained in position by retaining bolts 154 or the like. Also, for enclosing the feed cylinders 32 and the ways 20 and 22, a pair of generally L-shaped skirts 156 are provided and are detachably secured in place by suitable fastener elements or assemblies 158. The rear portions of the upper corner of each skirt 156 is provided with a recess 160 one of which receives a conduit 162 for conveying hydraulic fluid and the other receives an electric conduit 163. The details of the hydraulic system will be more explicitly described in relation to the schematic illustration thereof.

The chip box assembly 26 includes an end plate 164 secured to the base 12 by suitable fasteners 166 or the like. The end plate 164 forms part of a box structure 168 having sidewalls 170 and an end wall 172 and an open bottom closed by a chute 174 telescopically engaged over the periphery of the bottom of the box 168 and detachably secured thereto as by fastener bolts 178. The chute 174 has a laterally extending discharge tubular member 180 integral therewith and a drain trough may be provided for draining chips and coolant liquid to a suitable reservoir or the like. The detachable construction of the chute 174 enables the lateral discharge tube 180 to be directed either to the right or left for enabling the optimum conditions to exist.

The top of the chip box 168 is provided with a transparent cover plate 184 that is hinged at its outer edge by pivot points 186 to enable the inner edge of the plate 184 to be pivoted upwardly so that the upper edge of the end plate 164 is exposed. The upper edge of the end plate 164 is provided with a vertically extending notch 188 which removably receives an upper saddle member 190 received in grooves 192 in the side walls of the notch 188. The grooves 192 are continuous around the bottom of the notch and the saddle 190 has a groove in the arcuate bottom edge thereof which cooperates with the extensions of the grooves 192 to receive a bushing 194 for sealing the opening into the chip box to stop chips and oil from passing out of the chip box.

The end wall 172 includes a liner 196 in alignment with the axis of rotation of the gundrill 68 and the liner 196 is provided with a screwthreaded socket 198 for attachment of bushing 208. A holder 200 is attached to the chip box 168 and has a cylindrical portion 202 and a peripheral flange 204 engaging the machined surface of the end wall 172 and being secured in place by fastening bolts 206 and the like. The holder 200 includes the bushing 208 having a peripheral flange 210 thereon which is retained against the liner 196 by a fastener 212 extending into the threaded socket provided therefor.

Pivotally attached to the cylindrical member 202 is a U-shaped yoke 214 pivotally attached by securing means 216. Threaded through the bight portion of the U-shaped yoke is an elongated threaded rod 218 having a transversely extending handle 220 on the outer end thereof and having a work engaging hollow adapter 222 on the inner end thereof for engagement with one end of a piece of work 224 that is received in the cylindrical member 202 thus holding the workpiece 224 in alignment with the bushing 208 so that the gundrill 68 may form a precision hole or passage therein designated by numeral 228.

A filler sleeve 230 is disposed in the cylindrical member 202 and secured in place by a suitable screwthreaded fastener 232 or the like so that the workpiece 224 will be accurately supported and positioned in alignment with the rotational axis of the gundrill 68.

Figure 8:
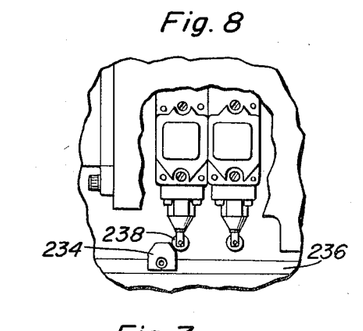
FIGURE 8 is a detailed view illustrating a limit switch assembly.
Figure 10:
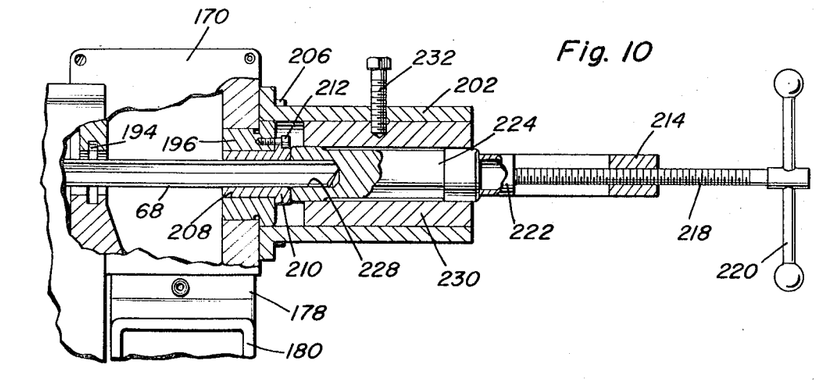
FIGURE 10 is a detailed sectional view illustrating the chip box and an attachment for holding a workpiece during a drilling operation.
Figure 11:
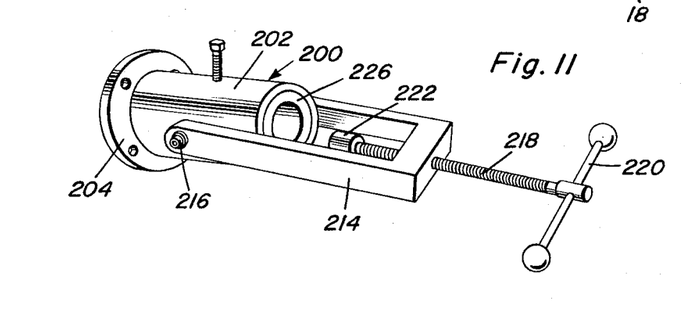
FIGURE 11 is a perspective view of the attachment illustrated in FIGURE 10.

FIGURE 8 illustrates a stop lug 234 adjustably supported on the base by reason of longitudinally extending rails or tracks 236 for engaging sensing rollers 238 for controlling valve control mechanisms for limiting the movement of the drilling head thus assuring that the gundrill 68 will not be retracted from the bushing assembly in the end plate 164.

Also, one of the stops 234 is set to limit the forward motion of the drilling head in order to facilitate control of the depth of the hole being gundrilled in a precision manner.

Figures 1, 12:
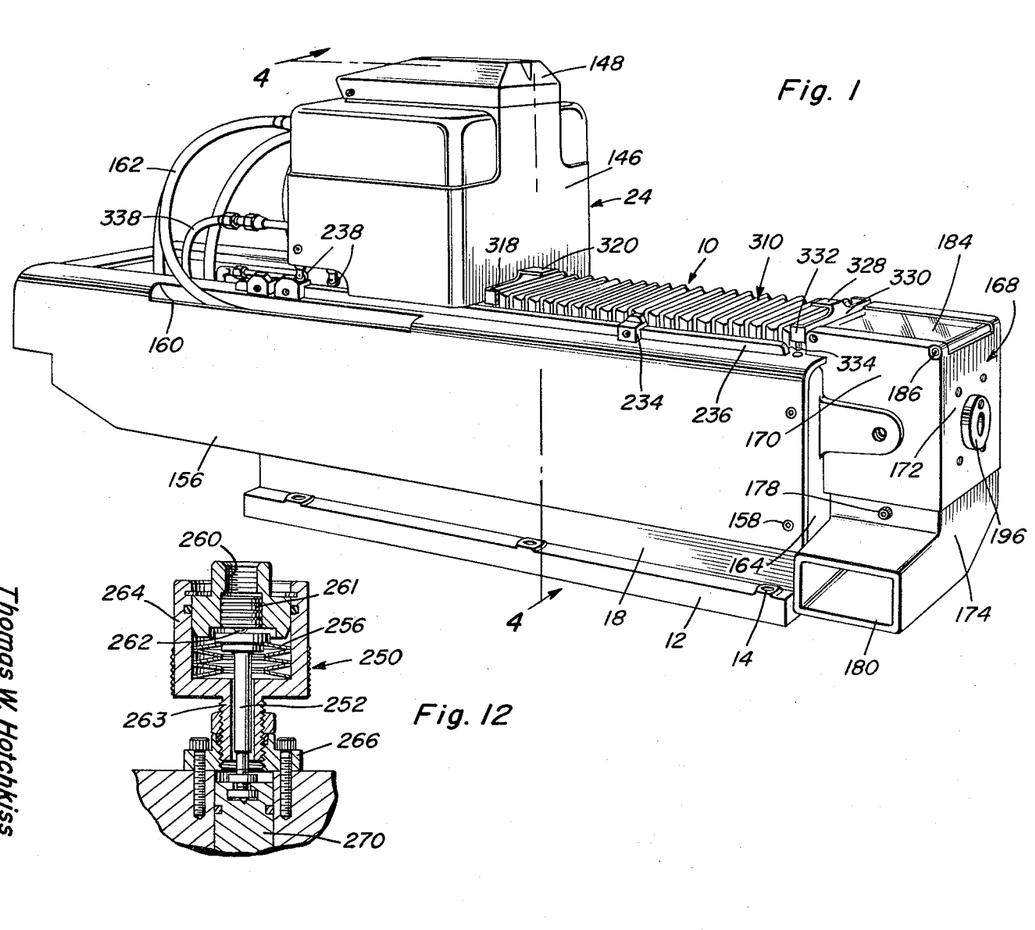
FIGURE 1 is a perspective view of the drilling machine of the present invention.
FIGURE 12 is a detailed sectional view illustrating a compensating mechanism employed in the hydraulic system for maintaining constant rotational speed of the spindle.

As illustrated in FIGURE 1 and several of the other figures, a bellows structure 310 is provided in overlying relation to the gundrill 68 and extends between the drill head 24 and the end plate 164 of the chip box for preventing egress of oil from this area of the machine and also protecting operators from coming into direct contact with the rotating gundrill. The bellows is extensible in length and includes basically a plurality of flexible panels 312 having opposite edges thereof secured together as at 314 and 316. When the panels are disposed side-by-side, the bellows will be collapsed but the panels may be disposed in extended position as illustrated in FIGURES 4 and 5 for covering the area between the skirts 156. Any suitable structure may be provided for connecting the ends of the bellows 310 to the head 24 and the end plate 164 respectively. For example, such structure may be in the form of an end plate 318 having an inwardly extending handle 320 at the upper edge thereof and having the lower edge wrapped around the innermost panel 312 and being detachably received within a clip 322 attached to the end of the head 24 formed by the housing 146. The handle 320 is relatively narrow and the ends of the plate 318 may have a flange 324 projecting therefrom for guiding the ends of the bellows panels during the collapsing and extension thereof and the edges of the bellows panels are downturned as at 326 and may rest on the inturned edges of the skirts 156.

The other end of the bellows 310 includes a handle structure 328 attached to an end plate 330 having similar flanges 332 thereon. The plate 330 is reversely folded at the bottom edge thereof for engaging the last flap of the bellows and it is received behind clips 334 attached to the skirt 156 for detachably connecting the outer end of the bellows to the end plate 164. Thus, any coolant or mist lubricant entering the area between the head 24 and the chip box 168 will not be slung upwardly by rotation of the gundrill 68. Yet, the bellows is easily detachable by lifting on the handles 320 and 328 in an obvious manner to enable easy removal thereof for replacement of the gundrill as becomes necessary.

Certain components of the machine including the hydraulic motor 130 are conventional and the spindle 62 is also a conventional component with it being adapted for the particular drive and having a transfer gland 336 on the extended end of the shaft 88 for rotatable connection with a coolant tube or hose 338 which in turn is connected with a tube 340 extending into and communicated with an adapter 342 on the mounting plate 119 for supplying coolant to the gundrill 68.

FIGURE 12 illustrates a significant feature of the invention including a compensator structure 250 in the hydraulic system for operating the hydraulic motor. Basically, the compensator is a single acting spring returned cylinder. The mechanical output is employed to vary the flow rate of the hydraulic pump in response to a system operating pressure. This adjustment is used to increase the pump output flow as the system pressure increases so as to compensate for inherent internal leakage. The leaks increase with increased pressure but the compensator maintains the effective flow at a constant level. Thus, with a proper selection of piston diameter and spring rate, the compensator can be used to maintain a constant hydraulic motor output speed regardless of what the system pressure is and thus maintain the constant speed at any motor load.

Figure 13:
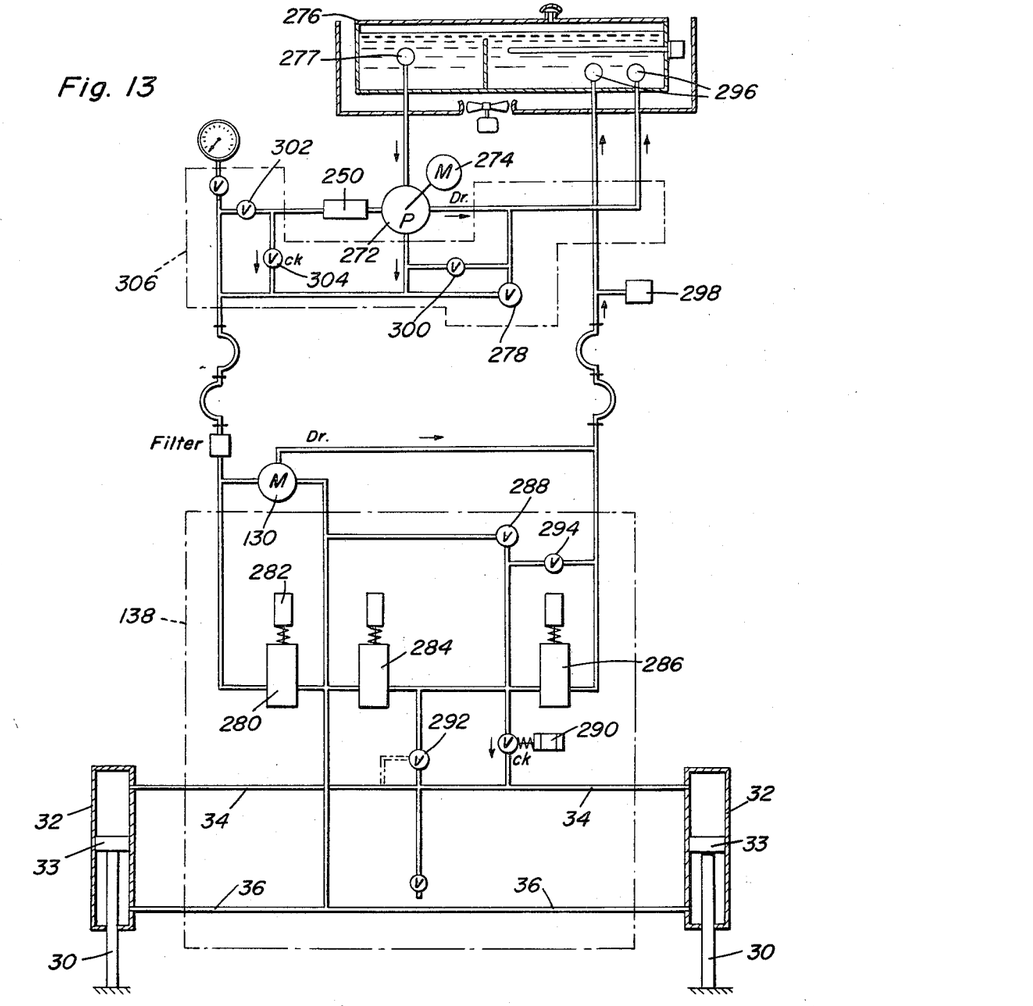
FIGURE 13 is a schematic view of the hydraulic system illustrating the relation of the hydraulic pump, hydraulic drive motor, a constant speed compensator assembly and associated structural details.

Referring now specifically to FIGURE 13, the pump 272 and motor 130 are both axial piston devices using the same operating principles. Each is equipped with a stem such as pump stem 270 and if the stem is displaced inwardly the output flow of the pump 272 will increase or the output speed of the motor 130 will decrease. The pump 272 is driven by an electric motor 274 and takes its suction from the reservoir 276 through inlet strainer 277 as indicated. Flow direction is indicated on FIGURE 13 by arrows. The pump 272 has a drain port marked Dr. which has an inherent output flow which increases as the system pressure increases. Relief valve 278 is a safety device to limit the maximum pressure in the system. When the solenoid 282 is energized the flow through valve 280 is cut-off and is diverted through the motor 130. Thus, the energization of this valve causes the spindle to rotate. The motor 130 also has a drain marked Dr. and the inherent flow through this port also increases as the pressure increases. When valve 284 is energized flow through this valve is cut-off and is diverted into the cylinders 32 through conduits 36. The pressure in conduit 36 is limited by relief valve 288 to a value suitable for gundrilling requirements within the range of the machine. Flow through conduits 36 into cylinders 32 causes flow out of cylinders 32 through conduits 34. Valve 290 in its deenergized position diverts flow through the variable pressure compensated flow control 292. The rate of flow through control 292 is adjusted with micrometer adjustment 140 and determines the rate of motion of cylinders 32 and thus the advance feed rate of the gundrill.

Relief valve 288 maintains the pressure in conduits 36 and the pressure found in conduits 34 varies depending on the thrust resistance exerted on the gundrill. The pressure compensated control 292 maintains a constant flow of oil from conduits 34 under varying conditions and therefore maintains feed rate independent of the thrust resistance on the gundrill. The oil after passing through the flow control 292 goes through valve 286 which is not energized and returns to the tank 276. To initiate rapid forward motion solenoid valve 284 and solenoid valve 290 are both energized. Solenoid valve 284 diverts the oil to conduits 36 and into cylinders 32. Solenoid valve 290 is energized and permits the oil coming from cylinders 32 through conduits 34 to flow through valve 286 and directly to tank 276. Thus the oil flowing through conduits 34 from the cylinders 32 is not limited by control 292 and flows directly through the solenoid valve 286 giving a rapid forward motion. The jog retract motion is initiated by energizing solenoid valve 286 which prevents flow to tank 276 and diverts all oil to the cylinders 32. Conduits 34 and 36 are at the same pressure and due to the difference in areas of the ends of the cylinders 32, the cylinders 32 go into a jog retract motion. Needle valve 294 which is manually adjustable is a bypass around solenoid valve 286. By adjusting valve 294, the jog retract rate of the device may be varied over a broad range. All of the fluid that returns out of the manifold 138 goes directly back to the reservoir 276 through the filters 296 involved. In this return line is a pressure switch 298 which is used as a safety device. When the filters 296 become dirty the pressure in the conduit concerned increases. The value of this pressure can become so high that detrimental action will occur to various components. The pressure switch 298 is set at a safe limit and when this limit is reached the switch 298 causes the electrical controls of the machine to be inoperative. Both the pump and the motor have drain lines marked Dr. which has an oil flow increasing with increasing system pressure. The relief valve 278 does not seal perfectly and allows some increasing leakage in response to system pressure increases and the solenoid valve 280 when energized has the same leakage characteristics. If no action is taken as the pressure increases in the system these inherent leaks increase and the spindle motor 130 will slow down. In order to suitably accomplish gun drilling the spindle must not be allowed to slow down. The compensator 250 is shown as an adjustable means on the pump 272 to prevent this spindle slow down.

Referring to FIGURE 12, fluid enters the compensator 250 at the port marked 260 and applies pressure against the piston 261 immediately thereunder. The force thus generated is passed through the ball 262 to the stem 252 and thence to the stem 270 of the pump 272. Five springs 256 are used to balance the forces generated. As the system pressure and hence the pressure at 260 increases the stem 252 is depressed downward and the pump stem 270 is depressed inward. This inward displacement of stem 270 increases output flow of pump 272. The leakages involved in the system as previously described all increase with increasing system pressure. Thus by the use of the compensator 250 with the appropriate values of piston area and spring rate these leakages may be compensated for resulting in a constant motor speed. The actual selection of components of pump 272 and motor 130 used in a machine indicates that a means must be made available to adjust the motor speed at any given system pressure. This is done by the threaded stem 263 on housing 264 and the threads inside of adapter 266. These provide the means of moving the entire unit up and down and thus changing the pump output and the speed of the motor. The components in different machines have different values of leakage. Valve 300 is provided to adjust each system to have the same total leakage flow as every other combination of components and enables the compensator 250 to function properly. In order to eliminate sudden fluctuations of the compensator, restriction 302 was added into the circuit. The check valve 304 was added to the circuit in order to minimize overspeeding upon sudden reduction of system pressure as when a gundrill finishes its operation. The components shown within the dotted line are enclosed in or attached to manifolds. The large manifold 138 shown with the solenoid valves and the cylinders 32 connected thereto are located upon the spindle housing. The smaller manifold 306 in the upper portion of FIGURE 13 is located near the pump 272 in a compact control package.

It is also contemplated that the specific structural details of the drill structure may be employed with an electric drive motor rather than the hydraulic drive motor. This, in no way, detracts from the advantages derived from the hydraulic motor but in certain production type procedures where the load requirements remain the same for a relatively large number of work-pieces, then an electric motor of a particular speed and power output may be employed for driving the spindles. Of course, the hydraulic feed and return system would be unchanged as would the majority of the remaining components.

The various conduits, fittings, pressure relief valves, solenoid operated valves, check valves and all similar components are of conventional and commercially available construction and the details thereof form no particular part of this invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drilling machine comprising a base having a pair of parallel longitudinal ways thereon, a drilling head reciprocally mounted on said ways, means interconnecting the base and drilling head for reciprocating the drilling head in relation to the base, said drilling head including a spindle rotatably mounted thereon and journaled for rotation about substantially a horizontally axis, a drive motor on said head for rotating said spindle, said spindle including means receiving a drill for rotation about a horizontal axis substantially paralleling the ways, and means controlling said motor for driving the spindle at a substantially constant speed, a chip box at the end of the base remote from the drilling head, said chip box including a bushing sealingly related to a gundrill carried by the spindle, said chip box including a bushing in an outer wall thereof, an adapter in said bushing for receiving the working end of the gundrill when advanced toward a working position, and machined surfaces on said box for receiving work holding attachments.

2. The structure as defined in claim 1 wherein said means for reciprocating the drilling head includes a pair of cylinders mounted on the drilling head, a rod inserted into each cylinder and being fixedly connected to the base, said rod having a piston thereon whereby introduction of fluid pressure into opposite ends of the cylinders in a selective manner will effect reciprocation of the drilling head.

3. The structure as defined in claim 2 wherein said cylinders and rods are orientated closely adjacent the ways and generally in alignment with the axis of rotation of the spindle for retaining the spindle close to the horizontal plane between the ways and providing an even pull on both sides of the drilling head to retain the axis of rotation of the spindle in alignment with the drilling axis.

4. The structure as defined in claim 1 together with a work holder attachment in the form of a cylindrical member receiving a workpiece, a clamp member alignable with the cylindrical member for retaining the workpiece in abutting engagement with said adapter in the bushing of the outer wall of the chip box.

5. The structure as defined in claim 1 wherein said means for driving the spindle includes a hydraulic motor, said means for controlling the speed of the spindle including a compensator in the hydraulic fluid system for maintaining a constant flow through the motor in response to load variations thereby maintaining a constant speed.

6. The structure as defined in claim 5 wherein said compensator includes a piston and cylinder assembly with the piston including a stem engageable with a mechanism for varying the flow of hydraulic fluid through the motor in response to increase of pressure in the system, and means adjusting the effective position of the stem for varying the output speed of the motor at different system pressures.

7. The structure as defined in claim 1 together with a chute connected with the chip box and extending laterally therefrom, means detachably connecting the chute to the chip box for extending laterally thereof in either lateral direction for enabling variation in the point of discharge of the chips and fluid.

8. A drilling machine comprising a base having a pair of parallel longitudinal ways thereon, a drilling head reciprocally mounted on said ways, means interconnecting the base and drilling head for reciprocating the drilling head in relation to the base, said drilling head including a spindle rotatably mounted thereon and journaled for rotation about substantially a horizontal axis, a drive motor on said head for rotating said spindle, said spindle including means receiving a drill for rotation about a horizontal axis substantially paralleling the ways, and means controlling said motor for driving the spindle at a substantially constant speed, a collapsible bellows extending between the drilling head to a point adjacent the ends of the ways remote from the head, a chip box at the end of the ways remote from the head, and means detachably connecting the bellows to the head and to the chip box for retaining material discharged from the chip box and preventing the drill from slinging such material.

9. The structure as defined in claim 8 wherein said means for driving the spindle includes a hydraulic motor, said means for controlling the speed of the spindle including a compensator in the hydraulic fluid system for maintaining a constant speed of the motor in response to load variations.

10. A drilling machine comprising a base having a pair of parallel longitudinal ways thereon, a drilling head reciprocally mounted on said ways, means interconnecting the base and drilling head for reciprocating the drilling head in relation to the base, said drilling head including a spindle rotatably mounted therein and journalled for rotation about substantially a horizontal axis, a drive motor on said head for rotating said spindle, said spindle including means receiving a drill for rotation about a horizontal axis substantially paralleling the ways, said means for reciprocating the drilling head including a pair of stationary rods connected with the base, said rods being disposed in the same horizontal plane as the axis of the spindle and in vertical alignment with said ways to reduce the tendency of the spindle to lift, tilt or cant a pair of cylinders connected with the head, said rods each including a piston slidable in the cylinders whereby admission of hydraulic fluid at selected ends of the cylinders will cause reciprocation of the head.

11. A drilling machine comprising a base having a pair of parallel longitudinal ways thereon, a drilling head reciprocally mounted on said ways, means interconnecting the base and drilling head for reciprocating the drilling head in relation to the base, said drilling head including a spindle rotatably mounted thereon and journalled for rotation about substantially a horizontal axis, a drive motor on said head for rotating said spindle, said spindle including means receiving a drill for rotation about a horizontal axis substantially paralleling the ways, and means controlling said motor for driving the spindle at a substantially constant speed, said means for driving the spindle including a hydraulic motor, said means for controlling the speed of the spindle including a compensator in the hydraulic fluid system for maintaining a constant flow through the motor in response to load variations thereby maintaining a constant speed, said compensator comprising a piston and cylinder assembly communicating with the system and operable in response to variation in pressure therein, said system having an increase in pressure upon an increase in the load exerted on the motor thus operating the compensator, said compensator being operatively associated with the hydraulic pump for increasing the flow of hydraulic fluid through the motor upon increase of load exerted on the motor thereby maintaining the output speed of the motor constant.

12. A compensator for use in the hydraulic drive system of a hydraulic motor for maintaining the output speed of the hydraulic motor constant regardless of load variations on the motor comprising a piston and cylinder assembly communicated with the hydraulic system and sensitive to variations in pressure in the system, said piston and cylinder assembly including a stem spring biased against hydraulic pressure in the system and engageable with a hydraulic supply pump mechanism for increasing the output of the pump in response to increase of pressure in the system, and means adjustably supporting the piston and cylinder assembly in relation to the pump mechanism for adjusting motor speed and enabling compensation for increased leakage at higher pressures, said means including a screw threaded connection with the pump.

References Cited

UNITED STATES PATENTS

| | | | |
|---|---|---|---|
| 1,374,109 | 4/1921 | Pierle | 74—242.1 |
| 2,026,776 | 1/1936 | Douglas | 60—52 |
| 2,098,214 | 11/1937 | Benedek | 77—33.5 |
| 2,255,783 | 9/1941 | Kendrick | 60—53 |
| 2,507,504 | 5/1950 | Cudini | 77—5 |
| 2,450,972 | 10/1948 | Le Tourneau | 82—32 |
| 2,627,194 | 2/1953 | Leifer et al. | 77—3 |
| 2,983,101 | 5/1961 | Tyler | 60—52 |
| 3,207,008 | 9/1965 | Roemer | 77—33.5 |

FRANCIS S. HUSAR, *Primary Examiner.*